United States Patent [19]

Miller et al.

[11] Patent Number: 4,465,820

[45] Date of Patent: Aug. 14, 1984

[54] COPOLYESTERCARBONATES

[75] Inventors: Kenneth F. Miller; William Hilakos, both of Mt. Vernon, Ind.

[73] Assignee: General Electric Company, New York, N.Y.

[21] Appl. No.: 500,846

[22] Filed: Jun. 3, 1983

[51] Int. Cl.$^3$ .............................................. C08G 63/64
[52] U.S. Cl. .................... 528/194; 528/173; 528/176
[58] Field of Search .................. 528/194, 176, 173

[56] References Cited

U.S. PATENT DOCUMENTS

| | | | |
|---|---|---|---|
| 4,238,597 | 12/1980 | Markezich et al. | 528/194 |
| 4,260,731 | 4/1981 | Mori et al. | 528/194 |
| 4,355,150 | 10/1982 | Bosnyak et al. | 528/194 |

Primary Examiner—Lester L. Lee
Attorney, Agent, or Firm—Martin B. Barancik

[57] ABSTRACT

A new aromatic copolyestercarbonate is achieved with 70 to 95 weight percent ester content and having consistently high 3.2 mm impact strength while maintaining a high level of stress cracking resistance.

7 Claims, No Drawings

COPOLYESTERCARBONATES

BACKGROUND OF THE INVENTION

Aromatic copolyestercarbonates are well known as copolymers derived from carbonate precursors, dihydric phenols and aromatic dicarboxylic acid or acid derivatives. Among the properties characterizing these polymers is a higher distortion temperature under load (DTUL) than for aromatic polycarbonate. When the simplest aromatic dicarboxylic acid or acid derivatives are employed, it has generally been found that a higher DTUL is achieved when more of the para-aromatic dicarboxylic acid, terephthalic acid, is employed as opposed to the meta-aromatic dicarboxylic acid, isophthalic acid. If a DTUL of about 163° C. is desired, it can be achieved with an aromatic copolyestercarbonate derived from bisphenol A and having approximately 72 weight percent ester of which 85% of the ester is terephthalate and 15% is isophthalate. This particular polymer has reasonable impact values in a Notched Izod system. Both the 3.2 millimeter and 6.4 millimeter thickness test pieces break in a brittle failure mode at approximately 32.6 kgf cm/cm of notch. This copolyestercarbonate retains a substantial number of bisphenol A polycarbonate properties to a great degree. However, this particular aromatic copolyestercarbonate composition displays unfavorable stress cracking of molded parts under many circumstances. This stress cracking can be caused by, inter alia, autoclaving, temperature cycling, and molding under ordinary processing conditions. Under these testing conditions bisphenol A polycarbonate shows excellent resistance to stress cracking.

It was therefore desirable to prepare an aromatic copolyestercarbonate which maintained as many of the positive properties of the high terephthalic acid containing copolyestercarbonate, for example the high DTUL, while substantially improving the stress cracking properties.

Initially the copolyestercarbonate which substantially reduced the stress cracking problems was an 80 weight percent ester copolyestercarbonate derived from approximately 100% isophthalate units. However, it was found that the impact resistance of this copolyestercarbonate at the 3.2 millimeter thickness could not be consistently maintained from preparation to preparation and appeared to be somewhat dependent upon molecular weight. Additionally, another problem occurred during the scaleup of the reaction to produce 9-11 Kgs of copolyestercarbonate in a single batch. Although the reaction was carried out in methylene chloride in a typical interfacial polymerization similar to that used in preparing aromatic polycarbonate and in accordance with the general disclosure of Quinn U.S. Pat. No. 4,238,596, the product copolyestercarbonate is difficult to resolubilize in methylene chloride. Nesistance, at least in the 3.2 mm section.

SUMMARY OF THE INVENTION

In accordance with the invention there is a composition comprising a copolyestercarbonate derived from a dihydric phenol, a carbonate precursor, a terephthalic acid or acid derivative and an isophthalic acid or acid derivative, said copolyestercarbonate having (1) from about 70 to about 95 weight percent ester content and (2) having a range of terephthalate groups which maintain a consistently high 3.2 millimeter Notched Izod impact resistance for the said copolyestercarbonate while concurrently achieving a high level of stress cracking resistance.

DETAILED DESCRIPTION OF THE INVENTION

The dihydric phenols which can be employed to prepare the copolyestercarbonates useful in this invention include the dihydric phenols generally found useful in preparing copolyestercarbonates and aromatic polycarbonates. Typical dihydric phenols which can be employed are
2,2-bis(4-hydroxyphenyl)propane (bisphenol A);
2,4'-dihydroxydiphenylmethane;
bis(2-hydroxyphenyl)methane;
bis(4-hydroxyphenyl)methane;
bis(4-hydroxy-5-propylphenyl)methane;
bis(4-hydroxy-2,6-dimethyl-3-methoxyphenyl)methane
1,1-bis(4-hydroxyphenyl)ethane;
1,1-bis(4-hydroxy-2-ethylphenyl)ethane;
2,2-bis(3-phenyl-4-hydroxyphenyl)propane;
bis(4-hydroxyphenyl)cyclohexylmethane; and
2,2-bis(4-hydroxyphenyl)-1-phenylpropane.

Bisphenols other than those having a carbon atom between the two phenols can also be employed. Examples of such groups of bisphenols include bis(hydroxyphenyl) sulfides, bis(hydroxyphenyl)ethers and bis(hydroxyphenyl) sulfoxides and the like.

The preferred family of dihydric phenols is illustrated below

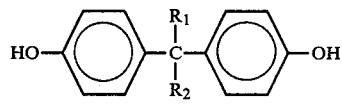

wherein $R_1$ and $R_2$ are the same or different and are hydrogen or alkyl of one to six carbon atoms, inclusive. The most preferred dihydric phenol is bisphenol A.

The aromatic dicarboxylic acids employed in the preparation of the copolyestercarbonate of the invention are terephthalic acid and isophthalic acid and reactive derivatives thereof. Any derivative of a carboxylic acid which is reactive with the hydroxyl of a dihydric phenol can be employed. The acid halides are generally employed because of their ease of reactivity and availability. The acid chlorides are preferred.

The phosgene precursor is the standard precursor employed for preparing aromatic polycarbonate or copolyestercarbonate. Generally, any of the carbonyl halides can n, U.S. Pat. No. 4,238,596 herein incorporated by reference.

The weight percent ester content in the copolyestercarbonate is from about 70 to about 95, preferably about 75 to 90. Above about 95 weight percent ester content the copolyester carbonate is generally more difficult to process. Below about 70 weight percent ester content the copolyestercarbonate DTUL is generally less than desirable. Weight percent ester content is calculated in the following manner wherein the dihydric phenol is bisphenol A.

Wt. % ester = 
$$\frac{(\text{mole \% ester}) (358)}{(\text{mole \% ester}) (358) + (\text{mole \% carbonate}) (254)} \times 100$$

$$\text{Mole \% ester} = \frac{\text{moles of aromatic diacid}}{\text{moles of dihydric phenol}} \times 100$$

358 = molecular weight of

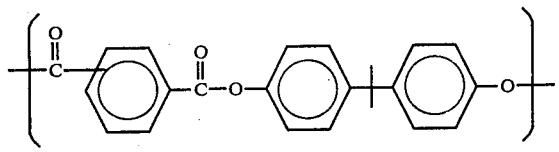

254 = molecular weight of

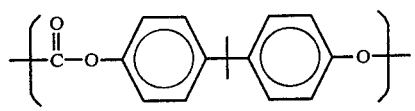

The quantity of terephthalate units present in the copolyestercarbonate is important in achieving the consistently high Notched Izod 3.2 mm impact resistance simultaneously with the high level of stress cracking resistance.

Below about two (2) percent of the ester content being terephthalate, (2% terephthalate, 98% isophthalate), the copolyestercarbonate generally does not provide as consistently high Notched Izod impact resistance in the 3.2 mm thickness from preparation to preparation. Additionally, there is a tendency for the product copolyestercarbonate to display crystallinity in the usual organic solvent employed for solubilizing the product, for example methylene chloride. When crystallization does occur, the copolyestercarbonate is not completely soluble in the organic solvent which once was capable of solubilizing the material. It is preferable to use better than about 5 percent terephthalate.

Above about fifteen (15) weight percent terephthalate, the copolyestercarbonate stress cracking resistance appears to diminish. A preferred maximum is less than about ten (10) percent terephthalate.

The following examples are intended to show the preparation and properties of a high terephthalate containing copolyestercarbonate, (Control 1), an isophthalate, no terephthalate containing copolyestercarbonate, (Control 2), and a series of examples within the invention range. These examples are intended only to illustrate and not narrow the broad inventive concept. All molded parts had stabilizing effective quantities of phosphite and epoxide.

CONTROL 1—COPOLYESTERCARBONATE RESIN WITH 72 WEIGHT PERCENT ESTER CONTENT—85 PERCENT TEREPHTHALATE

To a reactor fitted with a mechanical agitator are charged 10 liters of deionized water, 16 liters of methylene chloride, 1,910 grams (8.35 moles) of bisphenol A, 24 milliliters of triethylamine, 3.4 grams of sodium gluconate and 65 grams (0.43 mole) of paratertiarybutyl phenol. This reaction mixture is stirred and to the stirred reaction mixture are added over a 7–10 minute period a mixture of 926 grams of terephthaloyl dichloride and 163 grams of isophthaloyl dichloride as a 25 weight % solids solution in methylene chloride. During the acid chloride addition the pH is maintained in the range of 8.5–10.5 by the addition of 25% aqueous sodium hydroxide. The resulting mixture is phosgenated by the introduction of phosgene at the rate of 36 grams per minute for 15 minutes with the pH controlled at 9.5 to 12 by the addition of aqueous sodium hydroxide solution. After phosgenation is terminated 6 liters of methylene chloride are added, the brine layer is separated by centrifuge, and the resin solution is washed with aqueous acid and twice with water. The resin is steam precipitated and dried in a nitrogen fluid bed drier at approximately 115° C. This resin product is then fed to an extruder operating at a temperature of about 315° C. to extrude the resin into strands and the strands are chopped into pellets. The pellets are then injection molded at about 340° C. into test samples measuring about 63.5×12.7×3.2 mm. The Heat Distortion Temperature Under Load (DTUL) of these samples, 166° C., is determined according to modified ASTM D-648 test method. The izod impact strength is determined according to ASTM D-256 test method.

Also determined for the copolyestercarbonate resin is the Kasha Index (KI) which is an indication or measure of the processability of the resin, i.e., the lower the KI the greater the melt flow rate and, therefore, the better the processability. Basically, the Kasha Index is a measurement of the melt viscosity of the resin. The procedure for determining the Kasha Index is as follows: 7 grams of resin pellets, dried a minimum of 90 minutes at 125° C., are added to a modified Tinius-Olsen model T3 melt indexer; the temperature in the indexer is maintained at 300° C. and the resin is heated at this temperature for 6 minutes; after 6 minutes the resin is forced through a 1.048 mm radius orifice using a plunger of radius of 4.737 mm and an applied force of 8.03 kgf; the time required for the plunger to travel 50.8 mm is measured in centiseconds and this is reported as the KI. The higher the KI, the higher the melt viscosity and the more viscous the resin, and the more difficult to process.

The molded parts were tested for stress resistance in the following manner:

1. Autoclaving—the parts were autoclaved for 24 hours at 121° C. in saturated steam, allowed to equilibrate to room temperature for at least 18 hours, and then visually examined for stress cracks along the surface of the part.

2. Temperature cycling—the part is cooled to −20° C. to −40° C. for at least one hour and then transferred to an oven at 140° C. for one to two hours. Parts were visually examined for stress cracks along the surface after each cycle and after equilibration at room temperature for at least 18 hours.

3. Results—in the autoclaving test system four tensile impact test bars with dimensions of 163.5 mm×9.5 mm×3.2 mm were examined. All four test bars showed significant stress cracks on the surface and at the edges.

Various thickness Izod bars were subjected to the temperature recycling test system. After one "cold-hot" cycle, the 6.4 mm Izod bar showed stress cracks on the surface which grew in size after additional cycles. Three 3.2 mm Izod bars show stress cracks around the gate area after seven cycles. The cracks became progressively worse after further cycling.

This particular polymeric composition often displayed spontaneous stress cracks after preparation of a molded part under ordinary processing conditions and use. Examples of parts which have stress cracked include a 101.6 mm diameter disc of 3.2 mm thickness, electric terminal covers, golf tees and the like.

CONTROL 2—COPOLYESTERCARBONATE WITH 80 WEIGHT PERCENT ESTER CONTENT—ALL ISOPHTHALATE

To a reactor fitted with a mechanical agitator were charged 10 liters of deionized water, 16 liters of methylene chloride, 1.9 kg (8.35 moles) of bisphenol A, 24 milliliters of triethylamine, 3.4 grams of sodium gluconate and 37.6 g (0.25 moles) of para-tertiarybutyl phenol.

This reaction mixture was stirred and to the stirred reaction mixture were added over a 7-10 minute period 1.27 kg (6.27 moles) of technical grade isophthaloyl chloride (99.7% isophthaloyl chloride, 0.3% terephthaloyl chloride manufactured by Dupont) as a 30-45% solids solution in methylene chloride. During the acid chloride addition the pH was maintained in the range of 8.5-10.5 by the addition of 25% aqueous sodium hydroxide. The resulting mixture was phosgenated by the introduction of phosgene at the rate of 36 grams per minute for about 15 minutes with the pH controlled at 9.5-12 by the addition of aqueous sodium hydroxide solution. After phosgenation was terminated 6 liters of methylene chloride were added, the brine layer was separated by centrifuge, and the resin solution washed with aqueous acid and twice with water. The resin was steam precipitated and dried in a nitrogen fluid bed drier at approximately 115° C. This resin mixture was then fed to an extruder operating at a temperature of about 315° C. to extrude the resin into strands and the strands are chopped into pellets. The pellets are then injection molded at about 340° C. into test samples measuring about 63.5×12.7×3.2 mm. The formulation was tested in the manner stated previously. The heat distortion (DTUL) was found to be 162.3° C.

Stress Cracking

The stress crack testing systems used in Control 1 were repeated in Control 2. With respect to autoclaving, 12 test bars of the size used in Control 1 were tested in the same manner as Control 1. None of the bars developed stress cracking along the surface.

With respect to temperature cycling, two 3.2 mm Izod bars and two 6.4 mm Izod bars were subjected to the same test conditions as in Control 1. No stress cracks were observed after twelve cycles.

No spontaneous stress cracking was observed after molding many differently shaped parts, including parts which demonstrated stress cracking when molded from the composition of Control 1.

Impact Strength

The impact strength in the 3.2 mm Notched Izod test system varied significantly as a function of molecular weight, as measured by KI. Furthermore even at higher molecular weight, i.e., higher KI, the impact resistance still varied substantially.

With respect to differing molecular weight preparations the procedure of Control 2 was followed but with differing levels of chain terminating agent. A number of preparations were made at each molecular weight level. The 3.2 mm Notched Izod bars impact resistance was measured for a set of five bars from each preparation and the average value reported. The values in the Table represent the number of preparations in each KI range which provided the measured impact. Below are the results.

TABLE I

| KI | IMPACT RESISTANCE VALUES kgf cm/cm | | | | |
|---|---|---|---|---|---|
| | 10.9-21.8 | 21.8+-32.6 | 32.6+-43.5 | 43.5+-54.4 | >54.4 |
| 15-20 | 5 | 1 | — | 1 | — |
| 20+-25 | 7 | 2 | — | — | 1 |
| 25+-30 | 3 | 2 | 1 | 2 | — |
| 30+-35 | 2 | 4 | 2 | — | — |
| 35+-40 | 3 | 1 | — | 1 | — |
| 40+-50 | 1 | 2 | 3 | 7 | 12 |
| 50+-60 | 3 | 2 | 3 | 4 | 10 |

As is observed from the data, the lower molecular weight resin (lower KI) generally has substantially lower impact resistance. As molecular weight increases, in general the impact resistance also increases. However, even at high molecular weight values, 50+-60 KI, more than twenty percent (5/22) of the preparations still demonstrated relatively low impact resistance. The impact values are inconsistent from preparation to preparation.

The impact resistance for the 6.4 mm thick Izod bar is about 12 kgf cm/cm of notch.

Other Characteristics

Additionally, it was observed that many preparations of Control 2 led to the formation of a small fraction of insoluble product.

INVENTION EXAMPLES

The procedure of Control 2 preparation was followed except that quantities of isophthaloyl chloride were replaced with corresponding quantities of terephthaloyl chloride obtained from Dupont and varying levels of chain stopper employed.

The DTUL, 3.2 mm Notched Izod impact resistance value, and KI were measured for each preparation. Additionally molded parts were visually examined for stress cracking using the test procedures described in Control 1. In Table II below are the results.

TABLE II

| % TEREPH-THALATE | NUMBER OF PREP-ARATIONS | DTUL (°C.) | 3.2 mm IMPACT (kgf cm/cm) | KI CENTI-SECONDS |
|---|---|---|---|---|
| 3%* | 1 | 161.8 | 49.5 | 49310 |
| 5% | 7 | 161.1 | 50.0 | 33894 |
| 7% | 13 | 162.9 | 54.9 | 53016 |
| 10% | 3 | 160.4 | 58.2 | 36920 |
| 15% | 1 | 162.7 | 56.6 | 28180 |

*3% terehthalate means 3% terephthalate - 97% isophthalate.

The individual 3.2 mm Notched Izod value for each preparation versus KI is tabulated in Table III.

TABLE III

| KI CEN-TI-SEC-ONDS | 2.1 NOTCHED IZOD IMPACT STRENGTH (kgf cm/cm) | | | | |
|---|---|---|---|---|---|
| | 10.9-21.8 | 21.8+-32.6 | 32.6+-43.5 | 43.5+-54.4 | >54.4 |
| 25-30 | — | — | — | — | 3 |
| 30+-35 | — | — | — | — | 2 |
| 35+-40 | — | — | — | 1 | 3 |
| 40+-50 | — | — | — | 2 | 7 |
| 50+-60 | — | — | — | 5 | 2 |
| >60 | — | — | — | 1 | 1 |

As is observed from this data, the impact values are not dependent upon the KI values and at high KI the impact values are consistent in contrast with those values obtained with Control 2 preparations. The DTUL remained consistently high and essentially unchanged. All other tested properties including tensile and flexural strengths were substantially unchanged in comparison to Control 2 and substantially unchanged or better than Control 1 except for the 6.4 mm Izod bar impact values which were similar to those obtained in Control 2.

Stress Cracking

With respect to autoclaving, the test bar size used in Controls 1 and 2 was molded from fifteen preparations having from 3 to 10 percent terephthalate and autoclaved at 120° C. for 48 hours. No stress cracks were observed. Other molded parts examined after autoclaving indicated a slight increase in stress cracking with 10% terephthalate.

With respect to temperature cycling 6.4 mm Izod bars from 18 preparations having 3 to 15 percent terephthalate were subjected to ten temperature cycles as described in Control 1. No stress cracking was observed in samples containing 3 to 5% terephthalate. Infrequent and minor stress cracking was observed in samples containing 7% terephthalate. More frequent, although minor stress cracking was observed in samples with terephthalate $\geq 10$ percent.

No spontaneous stress cracking has been observed in any part molded from any of the preparations of this Example.

Other Characteristic

Incorporation of terephthalate in each of the above preparations reduces or eliminates the formation of an insoluble product fraction.

What is claimed is:

1. A composition comprising a copolyestercarbonate prepared from a dihydric phenol, a carbonate precursor, a terephthalic acid or ester forming derivative thereof, an isophthalic acid or ester forming derivative thereof, said copolyestercarbonate having (1) from about 70 to about 95 weight percent ester content and (2) a range of terephthalate groups which maintains a consistently high 3.2 millimeter Notched Izod impact resistance for the said copolyestercarbonate while concurrently achieving a high level improvement in stress cracking resistance the terephthalate groups being from about two to about 15 percent of the ester content.

2. A composition in accordance with claim 1 wherein the ester content is from five to about ten percent terephthalate.

3. A composition in accordance with claim 1 wherein the dihydric phenol is bisphenol A.

4. A composition in accordance with claim 2 wherein the dihydric phenol is bisphenol A.

5. A composition in accordance with claim 1 wherein the weight percent ester content is from about 75 to about 90.

6. An article injection molded from a composition of claim 1.

7. An article injection molded from a composition of claim 4.

* * * * *